United States Patent [19]

Burns et al.

[11] 3,798,470

[45] Mar. 19, 1974

[54] SELECTIVE D.C. ISOLATION CIRCUIT

[75] Inventors: Robert V. Burns, Tinley Park; Lloyd A. Tarr, Berkeley, both of Ill.

[73] Assignee: GTE Automatic Electric Laboratories Incorporated, Northlake, Ill.

[22] Filed: Dec. 15, 1972

[21] Appl. No.: 315,699

[52] U.S. Cl. .......... 307/252 R, 307/252 B, 307/302, 307/305, 323/22

[51] Int. Cl. .......... H03k 17/00

[58] Field of Search .......... 307/252 B, 252 N, 302, 307/305, 317, 324; 323/22

[56] References Cited

UNITED STATES PATENTS

| | | | |
|---|---|---|---|
| 3,517,254 | 6/1970 | McNamara | 307/305 X |
| 3,535,615 | 10/1970 | Howell et al. | 317/235 X |
| 3,585,403 | 6/1971 | Gribbons | 307/305 |
| 3,594,591 | 7/1971 | Laupman | 307/305 |
| 3,603,817 | 9/1971 | Casson | 307/305 |
| 3,638,043 | 1/1972 | Laupman | 307/305 |
| 3,644,754 | 2/1972 | Dosch et al. | 307/324 |

*Primary Examiner*—Andrew J. James
*Attorney, Agent, or Firm*—Robert F. Van Epps

[57] ABSTRACT

A selective d.c. isolation circuit comprising two series diacs, a resistor, and a triac which exhibits a high impedance to voltages less than a selected threshold value and a low impedance to higher voltages.

2 Claims, 2 Drawing Figures

SELECTIVE D.C. ISOLATION CIRCUIT

BACKGROUND OF THE INVENTION

1. Field of the Invention

The present invention relates generally to the field of solid state circuits and more particularly to a new and improved variable impedance circuit for the selective isolation of d.c. voltages.

2. Description of the Prior Art

Prior to the present invention variable impedance circuits have been in common use. One application of such circuits is in the field of telephony where a ground isolation circuit is used in a coin telephone to isolate the coin relay from the telephone line until detection of a so-called coin battery voltage from the telephone central office to effect collection or refund of deposited coins. The circuit exhibits a relatively high impedance until the battery voltage is detected and then provides a low impedance path until the current through the circuit falls below a selected level.

A typical ground isolation circuit of the prior art is schematically illustrated in FIG. 1. In this circuit the voltage threshold is determined by zener diode 10. Due to the characteristic temperature sensitivity of the zener diode voltage it is necessary to provide a compensating thermistor 12. The current required to fire the silicon controlled rectifier 14 is therefore determined by the total resistance of resistor 16 and thermistor 12. Diode 18 is required to protect the SCR from reverse voltage spikes.

Several problems are encountered in the use of the prior art ground isolation circuit. First, it has been found that the resistance of thermistor 12 may increase due to self-heating and thereby reduce the threshold firing voltage. Second, the maximum loop resistance using this circuit has been found to be less than that desired in the coin telephone application, and third, the prior art ground isolation circuit will operate only with voltages of the polarity indicated in FIG. 1.

OBJECTS AND SUMMARY OF THE INVENTION

From the preceding discussion it will be understood that among the various objectives of the present invention are included the following:

the provision of a new and improved variable impedance circuit;

the provision of a circuit of the above-described character which does not require temperature compensation means; and the provision of a circuit of the above-described character which is bidirectional in its operation.

The foregoing objectives are efficiently achieved by providing first and second series connected diac elements and a series resistance. A triac element is connected across the circuit and has its gate connected between the resistance and series diacs.

These and other objects, features, and advantages of the present invention will become more apparent from the following detailed description taken in conjunction with the appended drawings.

DESCRIPTION OF THE PREFERRED EMBODIMENT

Figure 1:
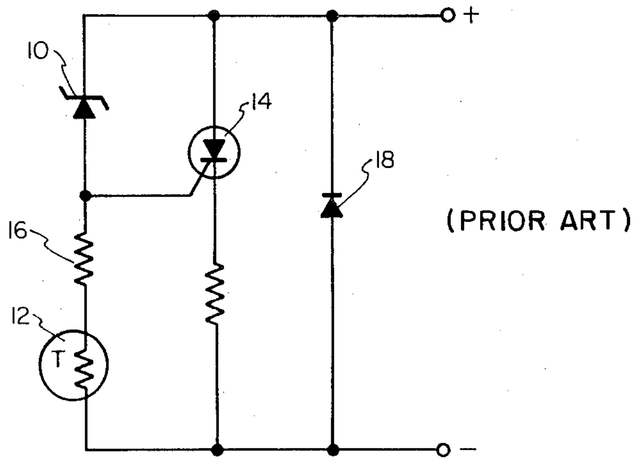
(PRIOR ART) FIG. 1
FIG. 1 is a schematic illustration of a prior art ground isolation circuit as described hereinabove.

The prior art ground isolation circuit shown in FIG. 1 having been described hereinabove, attention is directed to FIG. 2. The improved circuit of the present invention comprises first and second two-electrode, three-layer bidirectional avalanche diodes 20 and 22 commonly termed diacs. The diacs 20 and 22 are series connected with one another and with resistor 24. A triac element 26 connected by its two main terminals across the circuit has its gate electrode connected to a junction 28 between resistor 24 and diac 22. The triac 26 operates in a similar fashion to two silicon controlled rectifiers in parallel and oriented in opposite directions; i.e. it will conduct current in either direction between its main terminals. The triac thus exhibits first a forward-blocking state and then a forward-conducting state when the breakover voltage, which is controlled by the application of either a positive or negative current pulse to the gate electrode, is exceeded.

Figure 2:
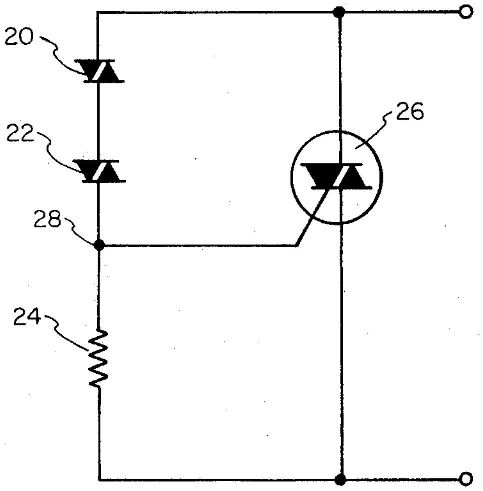
FIG. 2 is a schematic diagram of a ground isolation circuit in accordance with the principles of the present invention.

When the voltage across the two terminals of the circuit of FIG. 2 is less than the combined breakover voltage of the first and second diacs 20 and 22 the circuit exhibits a very high impedance characteristic. Once, however, the breakover voltage is exceeded the diacs conduct and current flows through resistor 24. When the voltage, due to current through resistor 24, at the gate electrode of triac 26 reaches the level necessary to switch the triac to its conducting state a very low impedance path exists between the two main terminals. Due to the characteristics of the triac it will remain in the conducting state until such time as the current through it falls below the holding current level.

It will be seen from the foregoing that since the threshold voltage is determined by the first and second diacs 20 and 22, rather than a zener diode, as was done in the prior art, the requirement for a temperature compensating thermistor is eliminated and the threshold voltage of the isolation circuit is more accurately maintained.

Assuming for the purposes of illustration that the prior art circuit of FIG. 1 employed a 60 volt zener diode at a 20 milliampere current to set the voltage threshold and a 110 volt battery, it may be shown that the maximum total allowable loop resistance in the telephone line would be 2,500 ohms. In contrast, with the circuit of FIG. 2, two 30 volt diacs with a total break-back voltage of 14 volts will give a series drop across the circuit of 46 volts and exhibit a total allowable loop resistance of 3,200 ohms. The circuit of the present invention may thus provide a total loop resistance increase of 700 ohms.

It will also be noted that all of the elements used in the circuit of the present invention are bidirectional thus allowing operation for both voltage polarities without the use of a diode bridge as required in the prior art.

From the preceding description it will be understood that the Applicants have provided a new and novel variable impedance circuit whereby the objectives set forth hereinabove are efficiently met. Since certain changes in the above-described construction will occur to those skilled in the art without departure from the scope of the invention it is intended that all matter contained in the description or shown in the appended drawings shall be interpreted as illustrative and not in a limiting sense.

Having described what is new and novel and desired to secure by Letters Patent, what is claimed is:

1. A selective d.c. isolation circuit for coupling across a variable voltage source and having a first impedance characteristic for less than a preselected voltage level and a second impedance characteristic for voltages greater than said preselected level, said circuit comprising a first bidirectional avalanche diode having a first preselected breakover d.c. voltage at and above which said diode is electrically conductive and below which said diode is electrically non-conductive;

a resistance element coupled in series with said avalanche diode, and a triac having first and second main terminals coupled in parallel with said avalanche diode and resistance element, a gate terminal connected between said avalanche diode and resistance element, and having a second preselected d.c. breakover voltage at and above which said triac exhibits a relatively low bidirectional electrical impedance between said main terminals and below which said triac exhibits a relatively high bidirectional electrical impedance, whereby in response to a d.c. voltage in excess of said first breakover voltage said avalanche diode and said resistance element conduct electrical current and thereby provide a voltage in excess of said second breakover voltage at the gate terminal of said triac element.

2. A circuit as recited in claim 1 further including a second bidirectional avalanche diode connected in series with said first bidirectional avalanche diode, and the combined d.c. breakover voltage of said first and second avalanche diodes being substantially equal to said first preselected d.c. breakover voltage.

* * * * *